(12) United States Patent
Fliess (10) Patent No.: US 10,342,037 B2
(45) Date of Patent: Jul. 2, 2019

(54) RADIO RECEIVER AND METHOD FOR PROCESSING AN UPLINK TRANSPORT BLOCK

(71) Applicant: Intel IP Corporation, Santa Clara, CA (US)

(72) Inventor: Thomas Fliess, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 165 days.

(21) Appl. No.: 15/238,242

(22) Filed: Aug. 16, 2016

(65) Prior Publication Data
US 2017/0086171 A1    Mar. 23, 2017

(30) Foreign Application Priority Data
Sep. 18, 2015   (DE) .......................... 10 2015 115 754

(51) Int. Cl.
| | | |
|---|---|---|
| *H04W 52/14* | (2009.01) | |
| *H04W 72/04* | (2009.01) | |
| *H04L 1/00* | (2006.01) | |
| *H04W 72/12* | (2009.01) | |
| *H04W 72/14* | (2009.01) | |

(52) U.S. Cl.
CPC ........ *H04W 72/1289* (2013.01); *H04W 72/14* (2013.01)

(58) Field of Classification Search
CPC ........... H04W 72/042; H04W 72/1289; H04W 52/146; H04W 52/343; H04W 52/365; H04W 72/0446; H04W 72/14; H04W 52/367; H04W 72/0473; H04L 1/0041

USPC .......................................................... 370/329
See application file for complete search history.

(56) References Cited

U.S. PATENT DOCUMENTS

| | | | | |
|---|---|---|---|---|
| 2011/0044453 A1* | 2/2011 | Sturniolo | ................. | H04K 1/00 380/255 |
| 2013/0039272 A1* | 2/2013 | Chen | ..................... | H04W 76/25 370/328 |
| 2015/0085951 A1* | 3/2015 | Shin | ..................... | H04L 27/2627 375/295 |
| 2015/0256291 A1* | 9/2015 | Shin | ...................... | H04L 1/0042 375/295 |
| 2016/0099796 A1* | 4/2016 | Yang | ................. | H03M 13/1177 714/776 |
| 2017/0013565 A1* | 1/2017 | Pelletier | .............. | H04W 52/146 |
| 2017/0142593 A1* | 5/2017 | Seo | ........................ | H04W 16/14 |
| 2017/0367058 A1* | 12/2017 | Pelletier | ............ | H04W 56/0045 |

* cited by examiner

*Primary Examiner* — Edan Orgad
*Assistant Examiner* — Vanneilian Lalchinthang
(74) *Attorney, Agent, or Firm* — Schwegman Lundberg & Woessner, P.A.

(57) ABSTRACT

A radio receiver (300) includes: a decoding stage (301) configured to decode a downlink control channel (310) comprising an uplink grant and to derive a time budget (311) from a decoded uplink grant; a processing stage (302) configured to determine an amount of payload potentially generated for an uplink transport block (313) based on the time budget (311) and to generate a payload section (312) of the uplink transport block (313) based on the determined amount of payload; and an encoding stage (303) configured to generate a padding section of the uplink transport block (313) and to encode the uplink transport block (313) comprising the payload section (312) and the padding section.

21 Claims, 6 Drawing Sheets

RADIO RECEIVER AND METHOD FOR PROCESSING AN UPLINK TRANSPORT BLOCK

This application claims the benefit of priority to German Patent Application No. 10 2015 115 754.3, filed Sep. 18, 2015, which is incorporated herein by reference in its entirety.

FIELD

The disclosure relates to a radio receiver and a method for processing an uplink transport block (UL TB) by a physical (PHY) layer and a media access control (MAC) layer. In particular, the disclosure relates to a method for handling large uplink (UL) grants in timing critical scenarios.

BACKGROUND

Figure 1A:
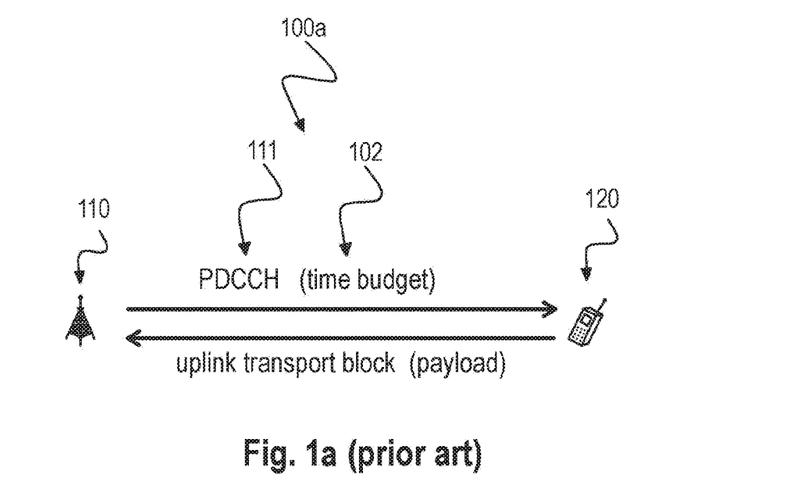
FIG. 1a is a system diagram 100a illustrating a conventional mobile communication system including a base station 110 and a mobile station 120, where the base station 110 transmits a physical downlink control channel (PDCCH) 111 including a time budget 102 to the mobile station 120
Figure 1B:
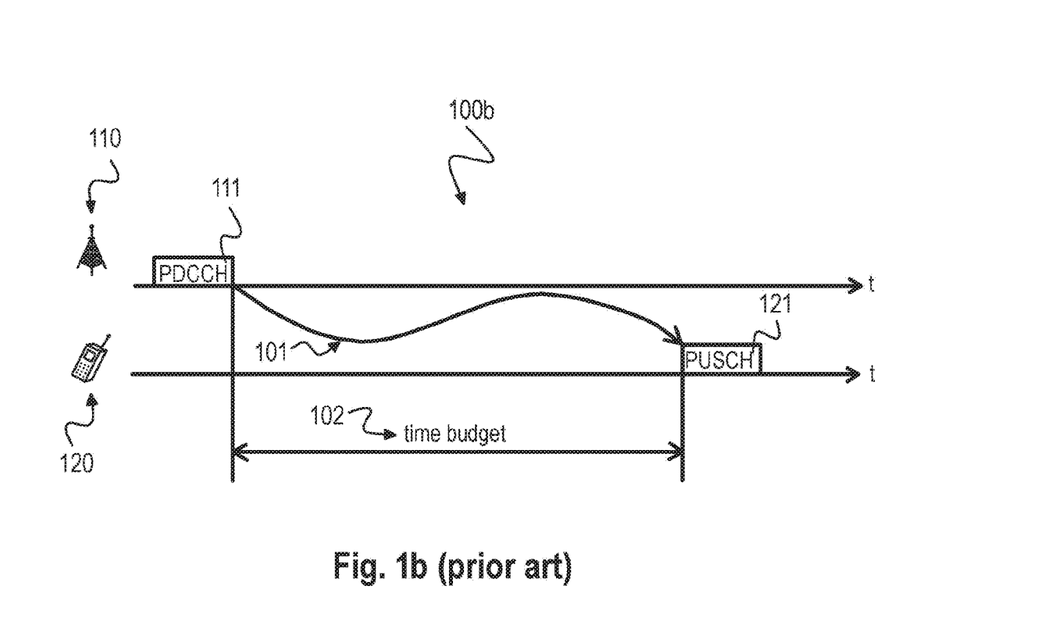
FIG. 1b is a corresponding time diagram 100b illustrating a conventional scheduling 101 of a physical uplink shared channel (PUSCH) 121 in response to the PDCCH 111 based on the time budget 102.

In a mobile communication standard such as LTE, uplink data on MAC level are transported in uplink shared channel (UL-SCH), using physical uplink shared channel (PUSCH) 121 in PHY layer. In the majority of use cases, PUSCH transmissions are triggered by UL grants on downlink control channel (PDCCH or ePDCCH) 111 received from a base station 110 (see FIG. 1).

Mobile communication standards like 3GPP standard require user equipment (UE) 120 to support a certain maximum transport block size as well as a certain maximum UL timing advance, i.e. a timing offset of UL transmissions 121 in relation to arrival of DL signals 111.

Furthermore, time of availability of UL grant information depends on the format of DL control channel 111, i.e. on ePDCCH usage or number of symbols in PDCCH 111.

New maximum transport block sizes (e.g. by added 64QAM support) and introduction of ePDCCH, where UL grant information is available much later than with PDCCH 111, impose a significant challenge to MAC layer to provide 101 UL-SCH transport blocks in time, i.e. within a predetermined time budget 102, especially when combined with large UL timing advances.

Since the support for maximum transport block sizes and maximum timing advance are treated as independent requirements, UE 120 implementation tends to be either overdesigned or not fully standard compliant (e.g. with respect to 3GPP), i.e. either too many resources (gate count, clock) have to be designed or the system has to drop grants.

There is a need to provide an efficient concept for a UE implementation that is saving resources and is yet standard compliant.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The devices and methods described herein may be used for various wireless communication networks such as Code Division Multiple Access (CDMA), Time Division Multiple Access (TDMA) and Frequency Division Multiple Access (FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. Cdma2000 covers IS-2000, IS-95, and IS-856 standards. A TDMA network may implement a radio technology such as Global System for Mobile Communications (GSM) and derivatives thereof such as e.g. Enhanced Data Rate for GSM. Evolution. (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

The methods and devices described herein may be implemented in wireless communication networks, for example communication networks based on mobile communication standards such as UMTS or LTE, in particular LTE-A and/or OFDM. The methods and devices described below may be implemented in mobile devices (or mobile stations or User Equipments (UE), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be applied on PHY level (or in a PHY layer) and MAC level (or in a MAC layer or sublayer) of a mobile communication standard as described above in the seven-layer OSI model of computer networking, the physical layer is the lowest layer (layer 1). The implementation of this layer is often named PHY. The physical layer includes the basic networking hardware transmission technologies of a network, e.g. a radio network. The physical layer defines the means of transmitting raw bits over a physical link connecting network nodes. The bit stream may be grouped into code words or symbols and converted to a physical signal that may be transmitted over a hardware transmission medium. The physical layer provides a physical, i.e. electrical, mechanical, and procedural interface to the transmission medium. The media access control (MAC) data communication protocol layer is a sublayer of the data link layer (layer 2). The MAC sublayer provides addressing and channel access control mechanisms to make it possible for several terminals or network nodes to communicate within a multiple access network that incorporates a shared medium, e.g. a mobile communication channel. The MAC sublayer acts as an interface between the logical link control (LLC) sublayer and the network's physical (PHY) layer. The MAC layer may generate the payload section of the UL TB, may add a header and padding to fit the UL TB in a transmission time interval (TTI). The MAC layer may submit a MAC packet data unit (PDU) to the physical layer for transmitting it onto physical channels.

The devices and methods described herein may be applied in Multiple-Input Multiple-Output (MIMO) systems. Multiple-Input Multiple-Output (MIMO) wireless communication systems may employ multiple antennas at the transmitter and at the receiver to increase system capacity and to achieve better quality of service.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

Figure 2:
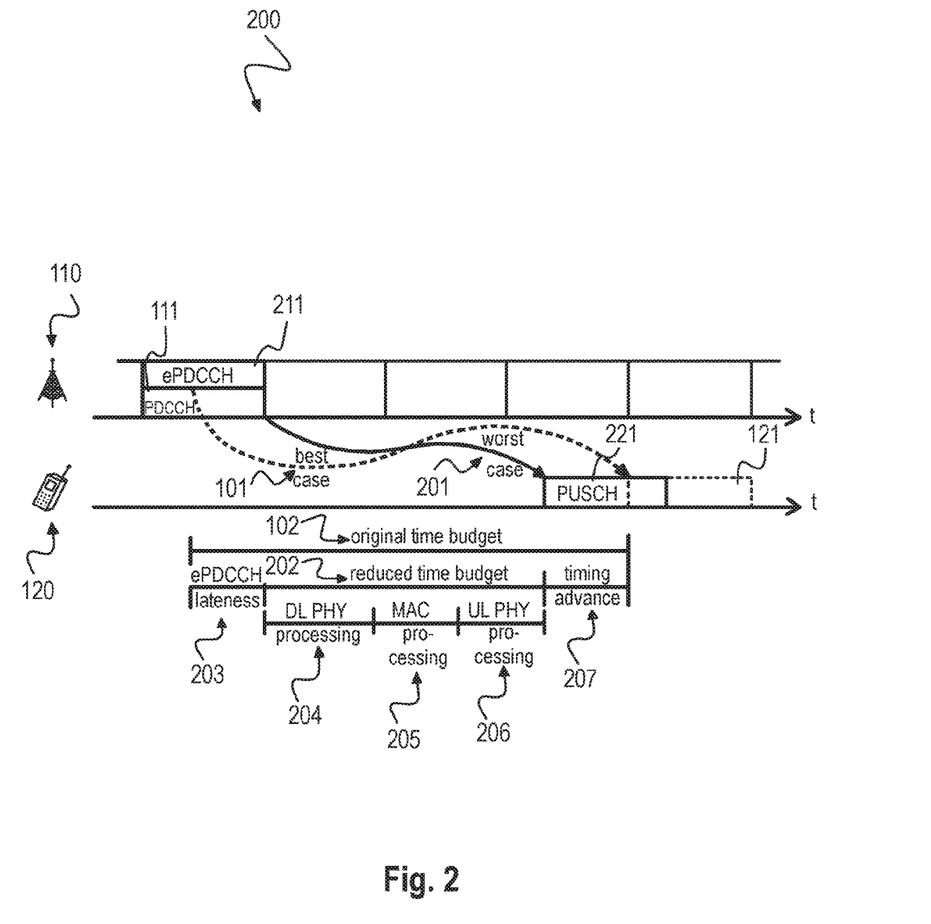
FIG. 2 is a time diagram 200 illustrating a scheduling 201 of a physical uplink shared channel (PUSCH) 221 in response to an enhanced physical downlink control channel (ePDCCH) 211 based on a reduced time budget 202 depending on an ePDCCH lateness 203 and a timing advance value 207 according to the disclosure.

FIG. 2 is a time diagram 200 illustrating a scheduling 201 of a physical uplink shared channel (PUSCH) 221 in response to an enhanced physical downlink control channel (ePDCCH) 211 based on a reduced time budget 202 depending on an ePDCCH lateness 203 and a timing advance value 207 according to the disclosure.

FIG. 2 illustrates the scenario that PUSCH transmissions are triggered by UL grants on downlink control channel (PDCCH or ePDCCH) 111 received from a base station 110. A best case scheduling 101 corresponds to the scenario illustrated above with respect to FIG. 1b, when PDCCH channel 111 is used and no timing advance is required. A worst case scheduling 201 corresponds to the scenario when ePDCCH channel 211 is used and a timing advance value 207, i.e. a timing offset of UL transmissions 221 in relation to arrival of DL signals 211, is required. Time of availability of UL grant information further depends on the format of DL control channel, i.e. on ePDCCH 211 usage or number of symbols in PDCCH 111.

Due to new maximum transport block sizes (e.g. by added 64QAM support) and introduction of ePDCCH 211, where UL grant information is available much later than with PDCCH 111 especially when combined with large UL timing advances 207, the original time budget 102 has been reduced to a reduced time budget 202 in which MAC layer has to finish all processing tasks.

However, in most practical scenarios, high timing advance values 207 coincide with high path loss and capacity of UL channels becomes severely limited by maximum transmit power of UE 120. Hence, maximum transport block size will not likely coincide with large timing advance values.

Methods and devices as described in the following exploit may be designed to determine a reduced time budget 202 from the original time budget 102 and perform a scheduling of the MAC layer processing based on the reduced time budget 202. The reduced time budget 202 may be derived from the original time budget 102 by subtracting the ePDCCH lateness time 203 and the timing advance (value) 207. The reduced time budget 202 may be divided between the DL PHY processing 204, the MAC processing 205 and the UL PHY processing 206, e.g. based on a performance of the different tasks.

In one exemplary scheduling, the original time budget 102 may be around 4 milliseconds (ms), the ePDCCH lateness time may be around 210 microseconds (µs) and the timing advance may be up to about 660 microseconds (µs) resulting in a reduced time budget 202 of about 3,130 milliseconds (ms). In an exemplary implementation, a MAC processing time budget 205 may be about 1.3 milliseconds (ms), while the remaining time budget can be divided between DL PHY processing 204 and UL PHY processing 206.

In the UE implementations as described hereinafter, resources are efficiently used yet providing fully standard compliance.

Figure 3:
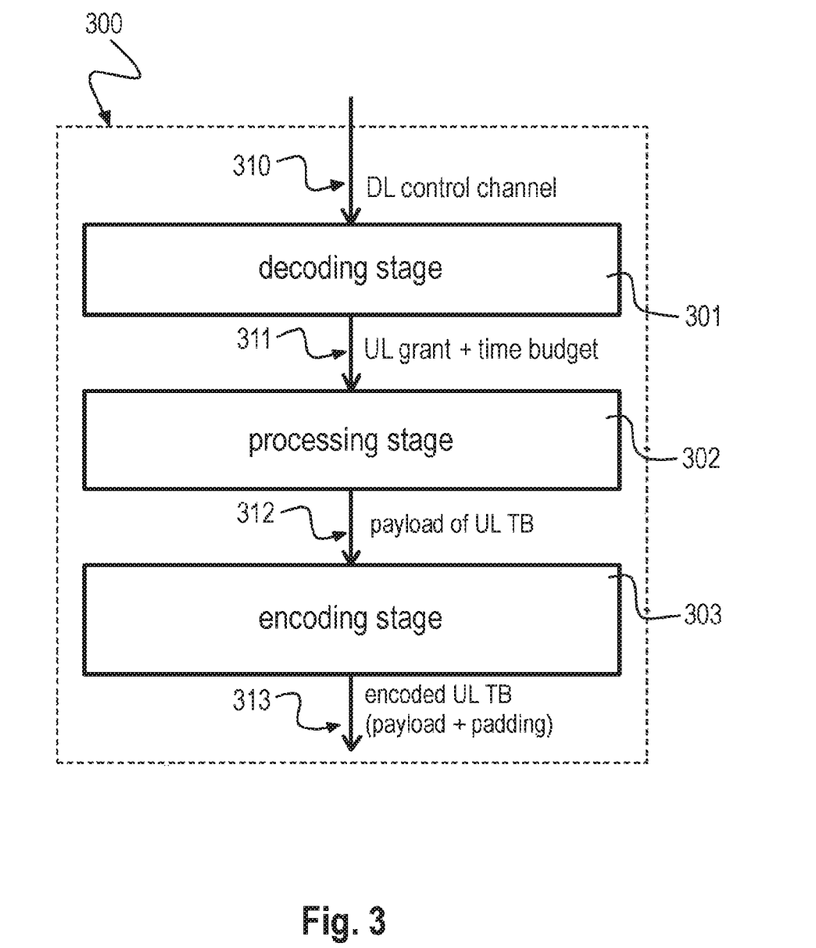
FIG. 3 is a block diagram illustrating a radio receiver 300 according to the disclosure.

FIG. 3 is a block diagram illustrating a radio receiver 300 according to the disclosure. The radio receiver 300 includes a decoding stage 301, a processing stage 302 and an encoding stage 303.

The decoding stage 301 decodes a downlink control channel 310 including an uplink grant and derives a time budget 311 from the decoded uplink grant. The time budget 311 indicates a time available for processing an uplink transport block 313.

The processing stage 302 determines an amount of payload that can be generated for the uplink transport block 313 based on the time budget 311. The processing stage 302 generates a payload section 312 of the uplink transport block 313 based on the determined amount of payload.

The encoding stage 303 generates a padding section of the uplink transport block 313 and encodes the uplink transport block 313 which includes the payload section 312 and the padding section.

The processing stage 302 may determine a size of the padding section and may indicate the determined size of the padding section to the encoding stage 303.

The processing stage 302 may provide address information of the payload section 312, e.g. a pointer to a data field where the payload section 312 is stored in the processing stage 302, to the encoding stage 303.

The processing stage 302 may provide the payload section 312 and information on a start of the padding section, e.g. a pointer to an end of a data field where the payload section 312 is stored in the processing stage 302, to the encoding stage 303.

The encoding stage 303 may generate the padding section during encoding at least a part of the uplink transport block 313. That is, the encoding stage 303 may encode the uplink transport block while it is still generating the padding section. Due to the performing of the padding in the encoding stage 303, the encoding stage 303 does not have to wait until the full uplink transport block 313 is provided by the processing stage 302. The overall processing time of the uplink transport block 313 can be reduced by that waiting time. The overall processing time can be further reduced by applying the above-described parallel processing of generating the padding section and encoding the uplink transport block 313.

Hence, the radio receiver 300 is an efficient UE implementation that is saving resources and is yet standard compliant.

The decoding stage 301 may derive a reduced time budget 202 for processing the uplink transport block 313 from the time budget 311 based on a timing advance value, e.g. a timing advance 207 as described above with respect to FIG. 2, which may be received in a downlink direction.

The timing advance value 207 may be based on a distance between the radio receiver 300 and a base station 110 providing the timing advance value 207. The timing advance value 207 may be independent of a size of the downlink control channel 310.

The radio receiver 300 may further include a receiving stage for receiving an enhanced physical downlink control channel (EPDCCH) or a physical downlink control channel (PDCCH) including the uplink grant 310.

The decoding stage 301 may derive a reduced time budget 202 for processing the uplink transport block 313 from the time budget 311 based on a size of the one of the enhanced physical downlink control channel (EPDCCH) and the physical downlink control channel (PDCCH).

Figure 4:
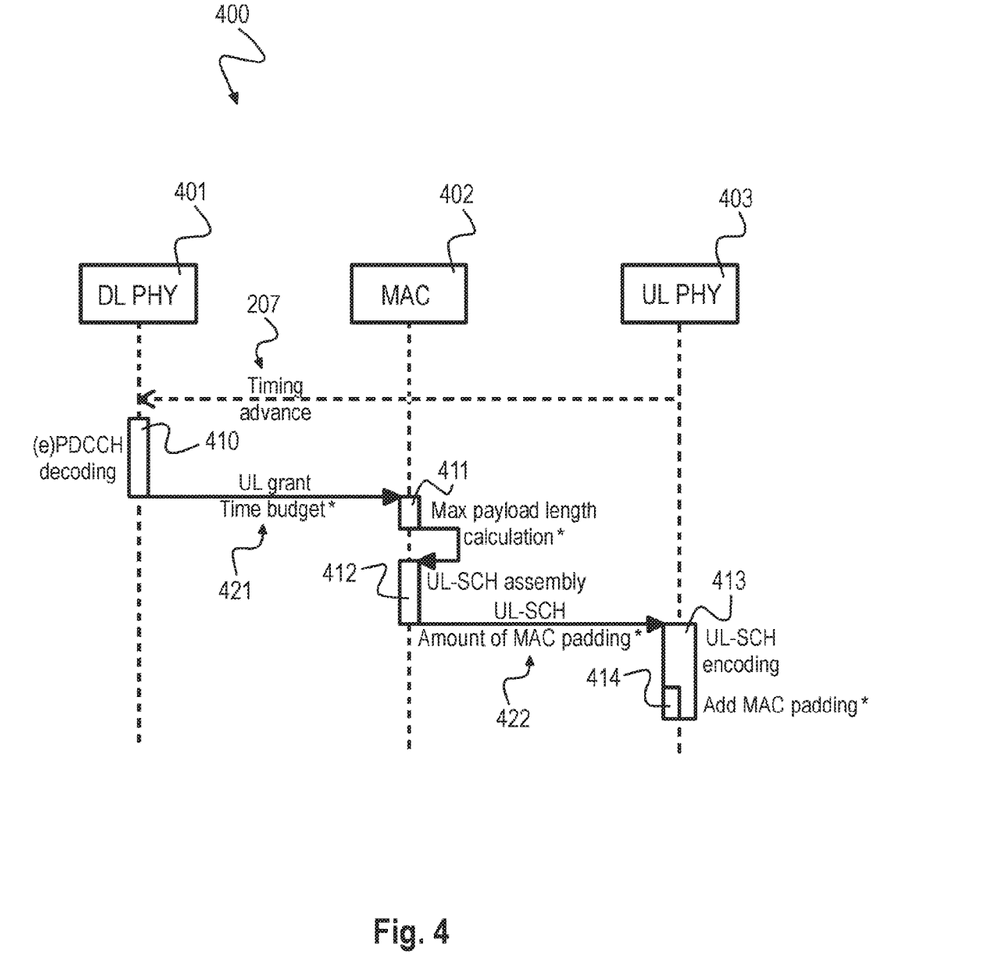
FIG. 4 is a sequence diagram illustrating the main components of a radio receiver circuit 400 according to the disclosure.

FIG. 4 is a sequence diagram illustrating the main components of a radio receiver circuit 400 according to the disclosure. The radio receiver circuit 400 includes a downlink physical layer (DL PHY) circuit 401, a media access control (MAC) circuit 402 and an uplink physical layer (UL PHY) circuit 403.

The downlink physical layer DL PHY circuit 401 decodes a downlink control channel 410 including an uplink grant and derives a time budget 421 from the decoded uplink grant 410. The time budget 421 indicates a time available for processing an uplink transport block 413.

The media access control (MAC) circuit 402 determines (or generates) an amount of payload 411 that can be generated for the uplink transport block 413 based on the time budget 421 and generates a payload section 412 of the uplink transport block 413 based on the determined amount of payload 411.

The uplink physical layer (UL PHY) circuit 403 generates a padding section 414 of the uplink transport block 413 and encodes the uplink transport block 413 including the payload section 412 and the padding section 414.

In particular the downlink physical layer DL PHY circuit 401 may correspond to the decoding stage 301 as described above with respect to FIG. 3; the media access control (MAC) circuit 402 may correspond to the processing stage 302 as described above with respect to FIG. 3; and the uplink physical layer (UL PHY) circuit 403 may correspond to the encoding stage 303 as described above with respect to FIG. 3.

The MAC circuit 402 may determine (or generate or compute) a size of the padding section 414. The MAC circuit 402 may indicate the determined size 422 of the padding section 414 to the UL PHY circuit 403.

The MAC circuit 402 may provide address information of the payload section 412 of the uplink transport block 413 to the UL PHY circuit 403, e.g. corresponding to the processing stage 302 as described above with respect to FIG. 3.

The MAC circuit 402 may provide the payload section 412 and information on a start of the padding section 414 to the UL PHY circuit 403, e.g. corresponding to the processing stage 302 as described above with respect to FIG. 3.

The UL PHY circuit 403 may generate the padding section 414 during encoding at least a part of the uplink transport block 413, e.g. corresponding to the encoding stage 303 as described above with respect to FIG. 3.

The DL PHY circuit 401 may derive a reduced time budget 202 for processing the uplink transport block 413 from the time budget 421 based on a timing advance value 207 received in a downlink direction, as described above with respect to FIG. 2.

In an exemplary embodiment, the radio receiver circuit 400 includes the following functionality. Upon UL grant decoding 410, DL PHY 401 may determine time budget 421 for MAC layer 402 to assemble UL-SCH 413, based on availability time of UL grant information, timing advance 207, and processing time in UL PHY 403. This time budget 421 may be signaled to MAC layer 402, along with actual UL grant information.

MAC layer 402 may determine, e.g. calculate 411, the amount of UL-SCH payload 412 it can generate in the given time budget 421, also considering local variables like current clock settings. Remaining capacity of transport block is not filled by MAC layer 402. Instead, amount of necessary MAC padding 422 may be signaled to UL PHY 403. Based on this information UL PHY 403 may add MAC padding 414 on its own while encoding UL-SCH 413.

The radio receiver circuit 400 can be designed for average use case instead for the worst case combination of all requirements. At the same time, full standard compliance can be maintained.

Supply voltage and clock for MAC layer 402 may be reduced during phases with low data rate, i.e. small transport block sizes, without the risk of missing an UL transmission when throughput suddenly increases.

In one exemplary embodiment of the radio receiver circuit 400, the following processing blocks may be executed when processing an UL grant: 1. DL PHY 401 decodes UL grant from PDCCH or ePDCCH 410. 2. PHY layer 401 derives time budget 421 for MAC layer 402 available for provisioning of UL-SCH transport block 413, considering time of UL grant availability (DL subframe time+DL PHY processing), Timing advance 207, UL PHY processing time, considering e.g. clock settings. 3. PHY layer 401 signals available timing budget to MAC layer 402, along with UL grant information 421. 4. MAC layer 402 determines amount of payload that can be generated for current transport block 413, considering signaled time budget and available compute power (e.g. limited by current clock settings). Size of remaining part, i.e. length of padding is calculated. 5. MAC layer 402 assembles UL transport block 413 but omits generation of MAC padding 414. 6. MAC layer 402 provides used part of transport block to PHY layer 403, along with information from where to start MAC padding 414. 7. PHY layer 403 appends padding 414 while encoding UL-SCH 413. This is usually more efficient in terms of time and energy.

Figure 5:
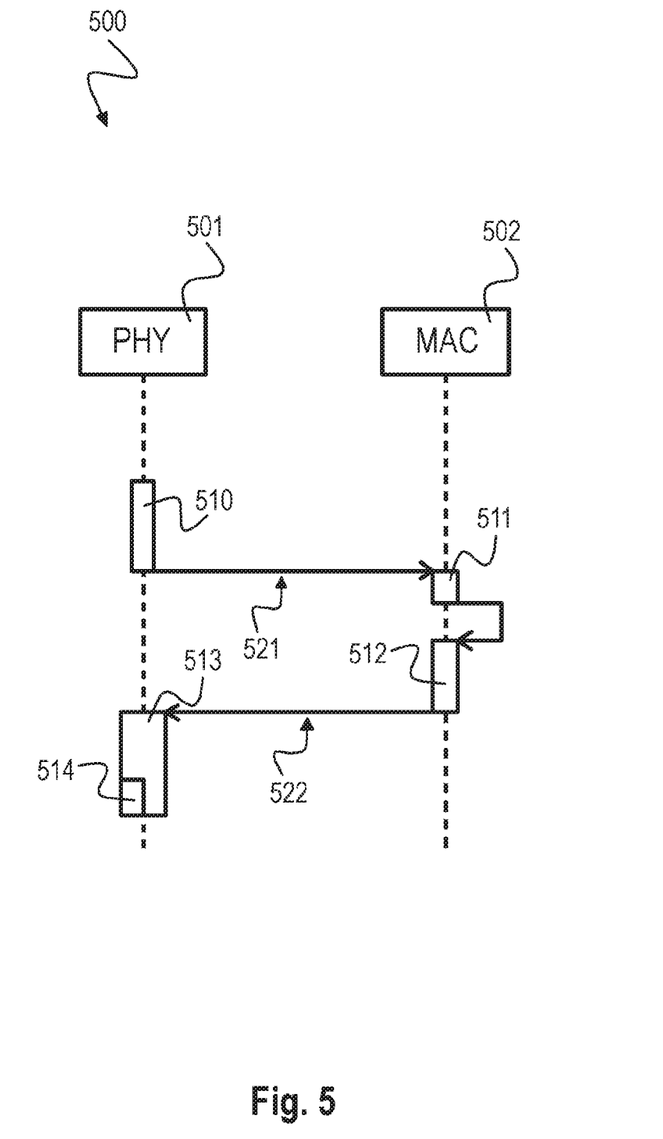
FIG. 5 is a sequence diagram illustrating the main devices of a radio receiver system 500 according to the disclosure.

FIG. 5 is a sequence diagram illustrating the main devices of a radio receiver system 500 according to the disclosure. The radio receiver system 500 includes a physical layer (PHY) device 501 and a media access control MAC device 502.

The PHY device 501 decodes an uplink grant information from a downlink control channel 510 and derives a time budget 521 from the decoded uplink grant 510. The time budget 521 indicates an amount of time available for provisioning of an uplink transport block 513. The MAC device 502 generates a payload section 512 of the uplink transport block 513 based on the time budget 521. The PHY device 501 generates a padding section 514 of the uplink transport block 513 and encodes the uplink transport block 513.

The PHY device 501 may correspond to both, the DL PHY circuit 401 and the UL PHY circuit 403 as described above with respect to FIG. 4. The MAC device 502 may correspond to the MAC circuit 402 as described above with respect to FIG. 4. The functionalities of the DL PHY circuit 401 and the UL PHY circuit 403 may be implemented in the one PHY device 501 depicted in FIG. 5.

The PHY device 501 may determine a reduced time budget, e.g. a reduced timing budget 202 as described above with respect to FIG. 2, for provisioning of the uplink transport block 513 based on a timing advance value, e.g. a timing advance 207 as described above with respect to FIG. 2, which may be received in a downlink direction.

The PHY device 501 may determine the reduced time budget 202 based on a time for processing the downlink control channel 510 and the uplink transport block 513 by the PHY device 501.

The PHY device 501 may determine the time for processing the downlink control channel 510 and the uplink transport block 513 based on clock settings of the PHY device 501.

The PHY device 501 may indicate the reduced time budget 202 to the MAC device 502. The MAC device 502 may process the uplink transport block 513 based on the reduced time budget 202 and the clock settings of the MAC device 502.

The PHY device 501 may encode the uplink transport block 513 during generating at least a part of the padding section 514, e.g. as described above with respect to FIGS. 3 and 4.

Figure 6:
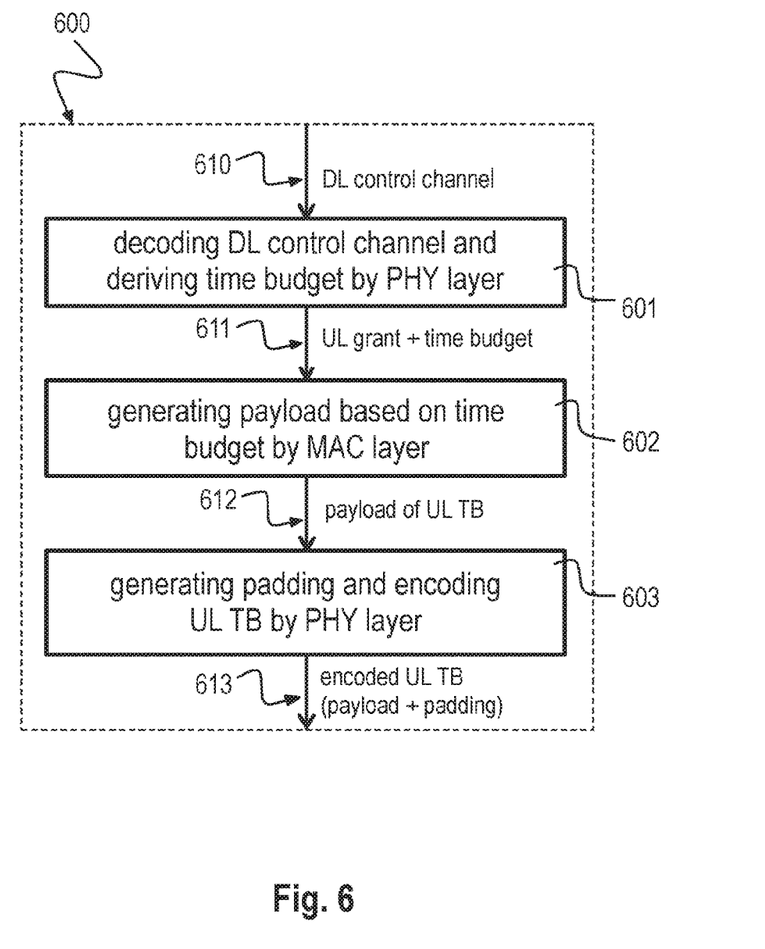
FIG. 6 is a schematic diagram illustrating a method 600 for processing an uplink transport block by a physical layer (PHY) and a media access control layer (MAC) according to the disclosure.

FIG. 6 is a schematic diagram illustrating a method 600 for processing a downlink control channel by a physical layer (PHY) and a media access control layer (MAC) according to the disclosure.

The method 600 includes decoding 601 a downlink control channel 610 including an uplink grant and deriving a time budget 611 from the decoded uplink grant 610 by the PHY layer, e.g. according to the functionality of the PHY layer 501 described above with respect to FIG. 5. The time budget 611 may indicate an amount of time available for provisioning of an uplink transport block 613.

The method 600 further includes generating 602 a payload section 612 of the uplink transport block 613 by the MAC layer based on the time budget 611, e.g. according to the functionality of the MAC layer 502 described above with respect to FIG. 5.

The method 600 further includes generating 603 a padding section of the uplink transport block 613 and encoding the uplink transport block 613 by the PHY layer, e.g. according to the functionality of the PHY layer 501 described above with respect to FIG. 5.

The method 600 may further include determining a reduced time budget 202 by the PHY layer based on a reduction of the time budget 102 by a timing advance value 207, e.g. according to the functionality described above with respect to FIG. 2.

The method may further include indicating the reduced time budget 202 by the PHY layer to the MAC layer; and processing the uplink transport block 613 by the MAC layer based on the reduced time budget 202, e.g. according to the functionality of the MAC layer 502 described above with respect to FIG. 5.

EXAMPLES

The following examples pertain to further embodiments. Example 1 is a radio receiver, comprising: a decoding stage configured to decode a downlink control channel comprising an uplink grant and to derive a time budget from a decoded uplink grant; a processing stage configured to determine an amount of payload potentially generated for an uplink transport block based on the time budget and to generate a payload section of the uplink transport block based on the determined amount of payload; and an encoding stage configured to generate a padding section of the uplink transport block and to encode the uplink transport block comprising the payload section and the padding section.

In Example 2, the subject matter of Example 1 can optionally include that the time budget indicates a time available for processing an uplink transport block.

In Example 3, the subject matter of any one of Examples 1-2 can optionally include that the processing stage is configured to determine a size of the padding section and to indicate the determined size of the padding section to the encoding stage.

In Example 4, the subject matter of any one of Examples 1-3 can optionally include that the processing stage is configured to provide address information of the payload section to the encoding stage.

In Example 5, the subject matter of any one of Examples 1-4 can optionally include that the processing stage is configured to provide the payload section and information on a start of the padding section to the encoding stage.

In Example 6, the subject matter of any one of Examples 1-5 can optionally include that the encoding stage is configured to generate the padding section during encoding at least a part of the uplink transport block.

In Example 7, the subject matter of any one of Examples 1-6 can optionally include that the decoding stage is configured to derive a reduced time budget for processing the uplink transport block from the time budget based on a timing advance value received in a downlink direction.

In Example 8, the subject matter of Example 7 can optionally include that the timing advance value is based on a distance between the radio receiver and a base station providing the timing advance value.

In Example 9, the subject matter of any one of Examples 7-8 can optionally include that the timing advance value is independent of a length of the downlink control channel.

In Example 10, the subject matter of any one of Examples 1-9 can optionally include a receiving stage configured to receive one of an enhanced physical downlink control channel (EPDCCH) and a physical downlink control channel (PDCCH) comprising the uplink grant and that the decoding stage is configured to derive a reduced time budget for processing the uplink transport block from the time budget based on a length of the one of the enhanced physical downlink control channel (EPDCCH) and the physical downlink control channel (PDCCH).

Example 11 is a radio receiver circuit, comprising: a downlink physical layer (DL PHY) circuit configured to decode a downlink control channel comprising an uplink grant and to derive a tame budget from a decoded uplink grant; a media access control (MAC) circuit configured to determine an amount of payload, potentially generated for an uplink transport block based on the time budget and to generate a payload section of the uplink transport block based on the determined amount of payload; and an uplink physical layer (UL PHY) circuit configured to generate a padding section of the uplink transport block and to encode the uplink transport block comprising the payload section and the padding section.

In Example 12, the subject matter of Example 11 can optionally include that the MAC circuit is configured to determine a size of the padding section and to indicate the determined size of the padding section to the UL PHY circuit.

In Example 13, the subject matter of any one of Examples 11-12 can optionally include that the MAC circuit is configured to provide address information of the payload section of the uplink transport block to the UL PHY circuit.

In Example 14, the subject matter of any one of Examples 11-13 can optionally include that the MAC circuit is configured to provide the payload section and information on a start of the padding section to the UL PHY circuit.

In Example 15, the subject matter of any one of Examples 11-14 can optionally include that the UL PHY circuit is configured to generate the padding section during encoding at least a part of the uplink transport block.

In Example 16, the subject matter of any one of Examples 11-15 can optionally include that the DL PHY circuit is configured to derive a reduced time budget for processing the uplink transport block from the time budget based on a timing advance value received in a downlink direction.

Example 17 is a radio receiver system, comprising: a physical layer (PHY) device; and a media access control (MAC) device, wherein the PHY device is configured to decode an uplink grant information from a downlink control channel and to derive a time budget from the decoded uplink grant information, wherein the MAC device is configured to generate a payload section of an uplink transport block based on the time budget, and wherein the PHY device is configured to generate a padding section of the uplink transport block and to encode the uplink transport block.

In Example 18, the subject matter of Example 17 can optionally include that the PHY device is configured to determine a reduced time budget for provisioning of the uplink transport block based on a timing advance value received in a downlink direction.

In Example 19, the subject matter of Example 18 can optionally include that the PHY device is configured to determine the reduced time budget based on a tame for processing the downlink control channel and the uplink transport block by the PHY device.

In Example 20, the subject matter of Example 19 can optionally include that the PHY device is configured to determine the time for processing the downlink control channel and the uplink transport block based on clock settings of the PHY device and clock settings of the MAC device.

In Example 21, the subject matter of any one of Examples 19-20 can optionally include that the PHY device is configured to indicate the reduced time budget to the MAC device; and that the MAC device is configured to process the uplink transport block based on the reduced time budget.

In Example 22, the subject matter of any one of Examples 17-21 can optionally include that the PHY device is configured to encode the uplink transport block during generating at least a part of the padding section.

Example 23 is a method for processing a downlink control channel by a physical layer (PHY) and a media access control (MAC) layer, the method comprising: decoding a downlink control channel comprising an uplink grant and deriving a time budget from a decoded uplink grant by the PHY layer; generating a payload section of an uplink transport block by the MAC layer based on the time budget; and generating a padding section of the uplink transport block and encoding the uplink transport block by the PHY layer.

In Example 24, the subject matter of Example 23 can optionally include determining a reduced time budget by the PHY layer based on a reduction of the time budget by a timing advance value.

In Example 25, the subject matter of Example 24 can optionally include indicating the reduced time budget by the PHY layer to the MAC layer; and processing the uplink transport block by the MAC layer based on the reduced time budget.

Example 26 is a computer readable medium on which computer instructions are stored which when executed by a computer, cause the computer to perform the method of one of Examples 23 to 25.

Example 27 is a device for processing a downlink control channel by a physical layer (PHY) and a media access control (MAC) layer, the device comprising: means for decoding a downlink control channel comprising an uplink grant and deriving a time budget from the decoded uplink grant by the PHY layer, the time budget indicating an amount of time available for provisioning of an uplink transport block; means for generating a payload section of the uplink transport block by the MAC layer based on the time budget; and means for generating a padding section of the uplink transport block and encoding the uplink transport block by the PHY layer.

In Example 28, the subject matter of Example 27 can optionally include means for determining a reduced time budget by the PHY layer based on a reduction of the time budget by a timing advance value.

In Example 29, the subject matter of Example 28 can optionally include means for indicating the reduced time budget by the PHY layer to the MAC layer; and means for processing the uplink transport block by the MAC layer based on the reduced time budget.

In Example 30, the subject matter of any one of Examples 17-22 can optionally include that the system is an on-chip system.

Example 31 is a receiver system, comprising: a decoding subsystem configured to decode a downlink control channel comprising an uplink grant and to derive a time budget from the decoded uplink grant, the time budget indicating a time available for processing an uplink transport block; a processing subsystem configured to determine an amount of payload that can be generated for the uplink transport block based on the time budget and to generate a payload section of the uplink transport block based on the determined amount of payload; and an encoding subsystem configured to generate a padding section of the uplink transport block and to encode the uplink transport block comprising the payload section and the padding section.

In Example 32, the subject matter of Example 31 can optionally include that the processing subsystem is configured to determine a size of the padding section and to indicate the determined size of the padding section to the encoding subsystem.

In Example 33, the subject matter of any one of Examples 31-32 can optionally include that the processing subsystem is configured to provide address information of the payload section to the encoding subsystem.

In Example 34, the subject matter of any one of Examples 31-33 can optionally include that the processing subsystem is configured to provide the payload section and information on a start of the padding section to the encoding subsystem.

In Example 35, the subject matter of any one of Examples 31-34 can optionally include that the encoding subsystem is configured to generate the padding section during encoding at least a part of the uplink transport block.

In Example 36, the subject matter of any one of Examples 31-35 can optionally include that the decoding subsystem is configured to derive a reduced time budget for processing the uplink transport block from the time budget based on a timing advance value received in a downlink direction.

In Example 37, the subject matter of Example 36 can optionally include that the timing advance value is based on a distance between the receiver system and a base station providing the timing advance value.

In Example 38, the subject matter of any one of Examples 36-37 can optionally include that the timing advance value is independent of a size of the downlink control channel.

In Example 39, the subject matter of any one of Examples 31-38 can optionally include a receiving subsystem configured to receive one of an enhanced physical downlink control channel (EPDCCH) and a physical downlink control channel (PDCCH) comprising the uplink grant.

In Example 40, the subject matter of Example 39 can optionally include that the decoding subsystem is configured to derive a reduced time budget for processing the uplink transport block from the time budget based on a size of the one of the enhanced physical downlink control channel (EPDCCH) and the physical downlink control channel (PDCCH).

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A radio receiver, comprising:
a receiving stage configured to receive one of an enhanced physical downlink control channel (EPDCCH) and a physical downlink control channel (PDCCH), the one of the EPDCCH and PDCCH comprising an uplink grant;
a decoding stage comprising a physical layer (PHY) device, the PHY device configured to decode the one of the EPDCCH and PDCCH and to derive a time budget from a decoded uplink grant, the decoding stage is configured to derive a reduced time budget for processing the uplink transport block from the time budget, the reduced time budget being smaller when the one of the EPDCCH and PDCCH is the EPDCCH compared with when the one of the EPDCCH and PDCCH is the PDCCH;
a processing stage comprising a media access control layer (MAC) device, the MAC device configured to determine an amount of payload potentially generated for an uplink transport block based on the time budget, the PHY device configured to indicate the reduced time budget to the MAC device, the MAC device configured to process the uplink transport block based on the reduced time budget, and the processing stage to generate a payload section of the uplink transport block based on the determined amount of payload; and
an encoding stage configured to generate a padding section of the uplink transport block and to encode the uplink transport block comprising the payload section and the padding section.

2. The radio receiver of claim 1,
wherein the time budget indicates a time available for processing an uplink transport block.

3. The radio receiver of claim 1,
wherein the processing stage is configured to determine a size of the padding section and to indicate the determined size of the padding section to the encoding stage.

4. The radio receiver of claim 1,
wherein the processing stage is configured to provide address information of the payload section to the encoding stage.

5. The radio receiver of claim 1,
wherein the processing stage is configured to provide the payload section and information on a start of the padding section to the encoding stage.

6. The radio receiver of claim 1,
wherein the encoding stage is configured to generate the padding section during encoding at least a part of the uplink transport block.

7. The radio receiver of claim 1,
wherein the decoding stage is configured to derive the reduced time budget for processing the uplink transport block from the time budget based on a timing advance value received in a downlink direction.

8. The radio receiver of claim 7, wherein the timing advance value is based on a distance between the radio receiver and a base station providing the timing advance value.

9. The radio receiver of claim 7, wherein the timing advance value is independent of a length of the one of the EPDCCH and PDCCH.

10. The radio receiver of claim 1, wherein:
the receiving stage is further configured to receive a timing advance value that is based on a distance between the radio receiver and a base station providing the timing advance value,
wherein the decoding stage is configured to derive the reduced time budget based on the timing advance value and, when the one of the EPDCCH and PDCCH is the EPDCCH, a lateness of the EPDCCH.

11. A radio receiver circuit, comprising:
a downlink physical layer (DL PHY) circuit configured to decode a downlink control channel comprising an uplink grant and to derive a time budget from a decoded uplink grant and a reduced time budget for provisioning of an uplink transport block based on a time for processing the downlink control channel and the uplink transport block by an uplink physical layer (UL) PHY circuit;
a media access control (MAC) circuit configured to determine an amount of payload potentially generated for an uplink transport block based on the time budget and to generate a payload section of the uplink transport block based on the determined amount of payload, the DL PHY circuit configured to indicate the reduced time budget to the MAC circuit, the MAC circuit configured to process the uplink transport block based on the reduced time budget; and
the UL PHY circuit configured to generate a padding section of the uplink transport block and to encode the uplink transport block comprising the payload section and the padding section.

12. The radio receiver circuit of claim 11, wherein the MAC circuit is configured to determine a size of the padding section and to indicate the determined size of the padding section to the UL PHY circuit.

13. The radio receiver circuit of claim 11, wherein the MAC circuit is configured to provide address information of the payload section of the uplink transport block to the UL PHY circuit.

14. The radio receiver circuit of claim 11, wherein the MAC circuit is configured to provide the payload section and information on a start of the padding section to the UL PHY circuit.

15. The radio receiver circuit of claim 11, wherein the UL PHY circuit is configured to generate the padding section during encoding at least a part of the uplink transport block.

16. The radio receiver circuit of claim 11, wherein the DL PHY circuit is configured to derive a reduced time budget for processing the uplink transport block from the time budget based on a timing advance value received in a downlink direction.

17. A radio receiver system, comprising:
a physical layer (PHY) device; and
a media access control (MAC) device,
wherein the PHY device is configured to decode an uplink grant information from a downlink control channel and to derive a time budget from the uplink grant information,
wherein the MAC device is configured to generate a payload section of an uplink transport block based on the time budget,
wherein the PHY device is configured to generate a padding section of the uplink transport block and to encode the uplink transport block,
wherein the PHY device is configured to determine a reduced time budget for provisioning of the uplink transport block based on a timing advance value received in a downlink direction and a time for processing: the downlink control channel and the uplink transport block by the PHY device,
wherein the PHY device is configured to indicate the reduced time budget to the MAC device; and
wherein the MAC device is configured to process the uplink transport block based on the reduced time budget.

18. The radio receiver system of claim 17, wherein the PHY device is configured to determine the time for processing the downlink control channel and the uplink transport block based on clock settings of the PHY device and clock settings of the MAC device.

19. The radio receiver system of claim 17, wherein the PHY device is configured to encode the uplink transport block during generating at least a part of the padding section.

20. A method for processing a downlink transport block by a physical layer (PHY) and a media access control (MAC) layer, the method comprising:
decoding a downlink control channel comprising an uplink grant and deriving a time budget from a decoded uplink grant by the PHY layer;
generating a payload section of an uplink transport block by the MAC layer based on the time budget;
generating a padding section of the uplink transport block and encoding the uplink transport block by the PHY layer;
determining a reduced time budget by the PHY layer based on a reduction of the time budget by a timing advance value;
indicating the reduced time budget by the PHY layer to the MAC layer; and
processing the uplink transport block by the MAC layer based on the reduced time budget.

21. The method of claim 20, further comprising:
determining the reduced time budget and the uplink transport block based on clock settings of the PHY layer and clock settings of the MAC layer.

* * * * *